Dec. 25, 1962 R. G. FERRIS 3,069,770
METHOD AND APPARATUS FOR MAKING TRACK CURVES AND PARTS THEREOF
Filed March 30, 1959 8 Sheets-Sheet 1

Inventor:
Robert G. Ferris
By: Hofgren, Brady, Wegner,
Allen & Stellman
Attorneys Dec. 25, 1962 R. G. FERRIS 3,069,770
METHOD AND APPARATUS FOR MAKING TRACK CURVES AND PARTS THEREOF
Filed March 30, 1959 8 Sheets-Sheet 2

Inventor:
Robert G. Ferris
By Hofgren, Brady, Wegner,
Allen & Stellman
Attorneys Dec. 25, 1962  R. G. FERRIS  3,069,770
METHOD AND APPARATUS FOR MAKING TRACK CURVES AND PARTS THEREOF
Filed March 30, 1959  8 Sheets-Sheet 3

Inventor:
Robert G. Ferris
By Hofgren, Brady, Wegner,
Allen & Stellman
Attorneys

Dec. 25, 1962 R. G. FERRIS 3,069,770
METHOD AND APPARATUS FOR MAKING TRACK CURVES AND PARTS THEREOF
Filed March 30, 1959 8 Sheets-Sheet 5

Inventor:
Robert G. Ferris
By: Hofgren, Brady, Wegner,
Allen & Stellman
Attorneys

Dec. 25, 1962    R. G. FERRIS    3,069,770
METHOD AND APPARATUS FOR MAKING TRACK CURVES AND PARTS THEREOF
Filed March 30, 1959    8 Sheets-Sheet 8

United States Patent Office 3,069,770
Patented Dec. 25, 1962

3,069,770
METHOD AND APPARATUS FOR MAKING
TRACK CURVES AND PARTS THEREOF
Robert G. Ferris, Harvard, Ill., assignor to Starline, Inc.,
a corporation of Illinois
Filed Mar. 30, 1959, Ser. No. 802,759
10 Claims. (Cl. 29—533)

This application relates to method and apparatus having as one purpose thereof the making of track curves usable in the handling of track suspended objects as disclosed in my copending application, Serial No. 761,488. In said application, several different forms of a track curve are disclosed, and each embodies a combination of a curved slotted track section with another slotted track section, either curved or straight, which when joined together provide a track curve having a single terminal at one end and a pair of diverging tracks with spaced apart terminals at the other end.

This track curve is usable with lengths of slotted track to support doors or other track suspended objects whereby a trolley for the object may travel to the track curve and then onto either diverging track as determined by directional forces applied to the trolley. The track curve is also usable to assemble objects approaching the track curve on the diverging tracks onto a track connected to the single terminal of the track curve. These different uses are fully disclosed in my copending application.

Another purpose of the method and apparatus disclosed herein is to form a curved tubular track section with an elongated slot along the length thereof which, when used with lengths of slotted track, forms a track support for trolley suspended objects such as doors which may travel around the corner of a barn or the like. The curved track section also can be utilized in changing the elevation of the track support. The curved tubular track section also constitutes a component of the track curve referred to in the preceding paragraphs. The curved tubular track section is formed from a tubular member which is curved and then slotted by mechanism disclosed herein.

This invention, in part, relates to a method and apparatus for making track curves from track sections formed from tubular members provided with an elongated slot whereby a trolley hanger may extend from the track section in which two or more of the track sections are assembled and secured together to provide the track curve having a plurality of diverging tracks.

This invention further relates to a method and apparatus for making a curved track section from an arcuate tubular member by producing an elongated slot extending along the underside of the tubular member which coincides with the center line of the tubular member along the length thereof and in which the curve of the track section may be of a large radius.

In the past, track sections have been formed with a slot extending lengthwise thereof by mounting a tubular member in a lathe and performing a lathe operation thereon. This has been only practical when the curve of the tubular member is of a small radius, but with curves of a larger radius lathes of a size to handle the track section have not been readily available. Also in a lathe operation the slot would follow a true circle and not necessarily the exact curvature of the track section and, as is often the case, the curve of the track section is not uniform with the result that the slot would deviate from the center line of the track section.

A feature of the invention is to form a curved conveyor track section with a slot therein from a tubular member by bending the tubular member to a desired curvature, supporting the curved tubular member at an operating location, reciprocating a hook-nose punch disposed within the tubular member across the wall of the member to nibble material from the wall, advancing the tubular member lengthwise relative to the operating location to progressively nibble material from the wall to form the slot and guiding the tubular member during the advancing movement thereof.

Another feature of the invention is to provide an apparatus for forming a slot in a track section formed from an arcuate tubular member in which the tubular member is supported at the underside thereof by a support and a reciprocating hook-nose punch disposed within the tubular member travels across the wall of the member closely adjacent the point of support thereof to remove material from the wall whereby advance of the tubular member relative to the punch produces a slot in the underside of the tubular member, and guide means defining a curved path of the same curvature as the member engageable with sides of the member for guiding thereof relative to the punch whereby the punch forms the slot along the center line of the tubular member.

When merging side-by-side track sections of the same circular cross section into a track curve having a single track at one end, the cutting of a segment from each of the sections must be carried out on a saw cut radius which is identical for each of the sections to secure matching relationship between the sawed edges of the two sections. If the saw cut radius is too great, an excessively long cut is taken from a straight tubular section and too short a cut from a curved track section, while if the radius is too little, the cut on the straight track section will be too short and too long on the curved track section. In either case, a mismatching of edges occurs resulting in gaps between the two track sections.

Another feature of the invention is the formation of a conveyor track curve having a common end and a pair of spaced apart ends composed of a pair of integrally merged tubular track sections of the same cross section with at least one of these sections being arcuate and each having a slot extending along the underside thereof. A segment is cut from the side of each of the track sections along the length thereof and along an arcuate line passing through the slot of each track section at the point where the center lines of the track sections are common to each other when the track sections are superimposed one above the other and through a point where the sections would diverge from each other if superimposed one above the other, assembling the track sections side by side and associating a reinforcing plate with said track sections having a cut-out to provide a shape for the plate following the junction of the sections both above and below the junctions and securing said tubular members and plate together into a rigid structure.

Still another feature of the invention is to provide apparatus for cutting lengthwise of a track section to remove a segment from a side of the section comprising a saw table having an opening to permit passage of a saw blade therethrough, a plate disposed above the table, an arm fixed to said plate witht means mounting said arm for pivotal movement about an axis remote from the table, an elongated slot in the plate having a curvature with said axis as a center to permit passage of a saw blade therethrough as the plate is pivoted about said axis, means on the plate for locating and holding a curved track section with a part thereof overlying said slot to enable cutting of a segment therefrom by a saw blade as the plate is pivoted, and means on the plate for locating and holding a straight track section with part thereof overlying said slot to enable cutting a segment therefrom by a saw blade as the plate is pivoted.

The invention is illustrated in the accompanying drawings in which.

Figures 13, 13A:
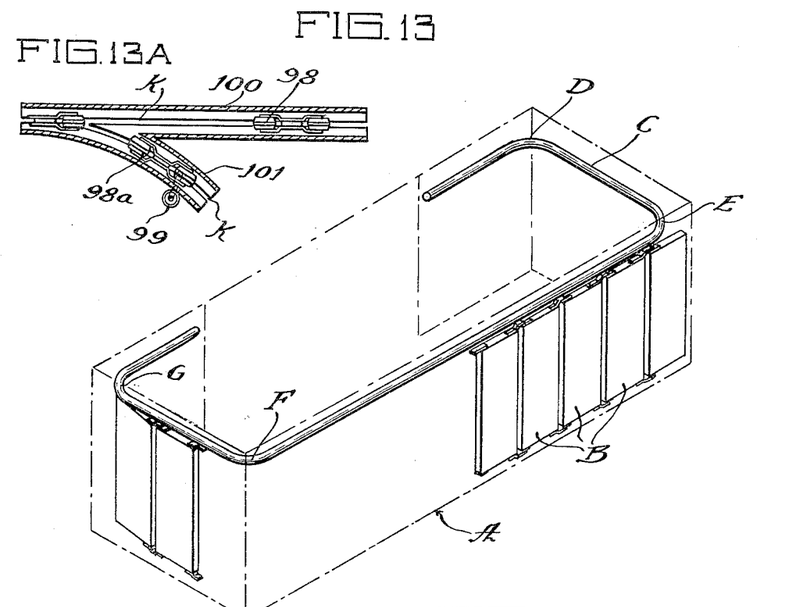
FIG. 13 is a perspective view showing a door supporting system utilizing the slotted tubular track sections formed by the apparatus of FIGS. 1 to 5.
FIG. 13a is a diagrammatic plan view of a trolley supporting track having a track curve.
Figure 14:
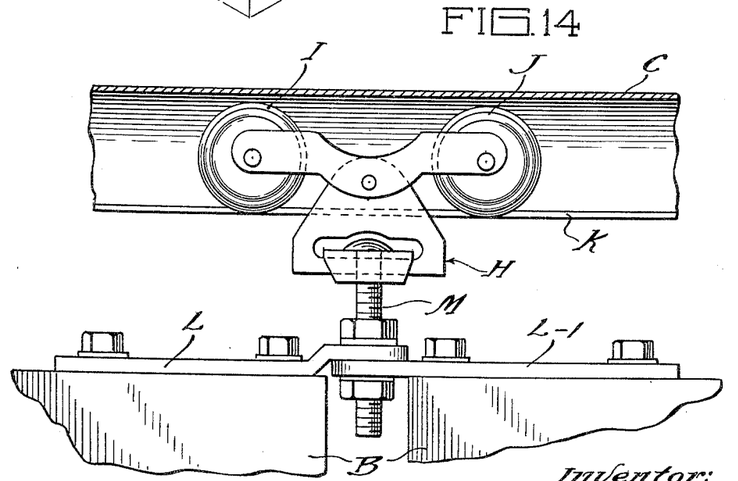
FIG. 14 is a fragmentary vertical section showing in greater detail the support of doors from the tubular track section.

Referring first to FIGS. 13 and 14, one use of the track section is shown in supporting a plurality of movable door panels for a building, indicated generally at A, in which the doors B may be moved along a track C to various positions to form partitions or closures for a building opening. The track includes curved sections D, E, F and G formed by the method and apparatus disclosed herein. As shown in FIG. 14, the track C houses trolleys, one of which is shown at H, carrying a pair of rollers I and J rotatably mounted in the track C. A trolley stirrup extends through a slot K formed on the underside of the track and extending along the center line thereof. A pair of plates L and L-1 attached to a threaded member M on the trolley pivotally support a pair of doors B from the track. The curved track sections D, E, F and G may have a radius of curvature as required, and this radius may vary widely depending upon the particular requirements of the installation.

Other embodiments and uses of the track are disclosed in my copending application Serial No. 761,488 filed September 17, 1958. Reference may also be made to my prior application for further description of the trolley structure referred to above.

The slot cutting apparatus, as disclosed in FIGS. 1 to 5, is arranged to cut a slot K along the underside of a tubular member in which the plane of the slot is at right angles to the plane of the curve of the tubular member. The apparatus embodies a tabletop 30 supported on a table 31, shown in FIG. 6, and having an opening receiving a die shoe 32 having its top flush with the tabletop 30. The die shoe is supported on the table 31 by means of machine bolts 33. The die shoe 32 has a central opening 34 to receive an annular die bushing 35 which is secured to the die shoe by machine bolts 36 and 37. To accommodate the die shoe to a tubular member in which the slot is formed on the inside of the curve, as described hereinafter, the die shoe is slotted or dished out as shown at 32a and 32b.

Figures 8, 9, 10, 11, 12, 12A:
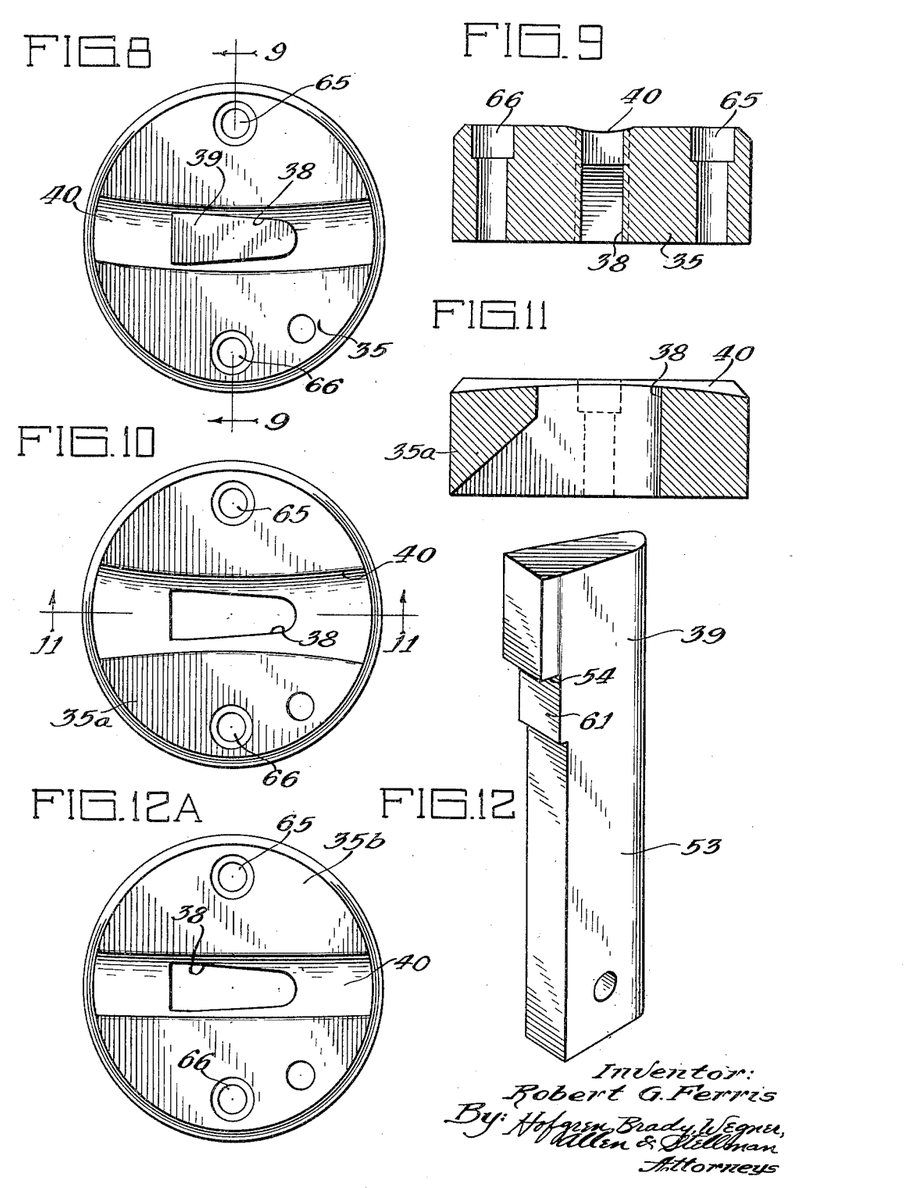
FIG. 8 is a plan view of the die bushing and punch shown in FIG. 4 for slotting a tubular member bent on a small radius.
FIG. 9 is a vertical section of the die bushing taken generally along the line 9—9 in FIG. 8 with the punch omitted.
FIG. 10 is a plan view of the die bushing shown in FIGS. 6 and 7 on an enlarged scale.
FIG. 11 is a vertical section taken generally along the line 11—11 in FIG. 10.
FIG. 12 is a perspective elevational view of the hook-nose punch of the type utilized in the slot cutting apparatus.
FIG. 12a is a plan view of the die bushing for slotting a tubular member curved on a relatively larger radius.

The die bushing 35 has an opening 38 extending therethrough shaped to slidably confine a hook-nose punch 39 as shown in FIG. 12, and which will be described more fully hereinafter. The die bushing 35 also has a dished-out channel 40 having a curvature theerin corresponding to the curvature of a tubular member in which the slot K is to be produced. The punch 39 is further guided by a perforate plate 39a disposed beneath the die bushing and secured to the die shoe by bolts 39b, and prevents the punch moving forward when nibbling is not occurring. The plate 39a has a passage 39c which, with a connecting opening 39d in the die bushing, provides a path for discharge of slugs.

Figures 1, 2, 3:
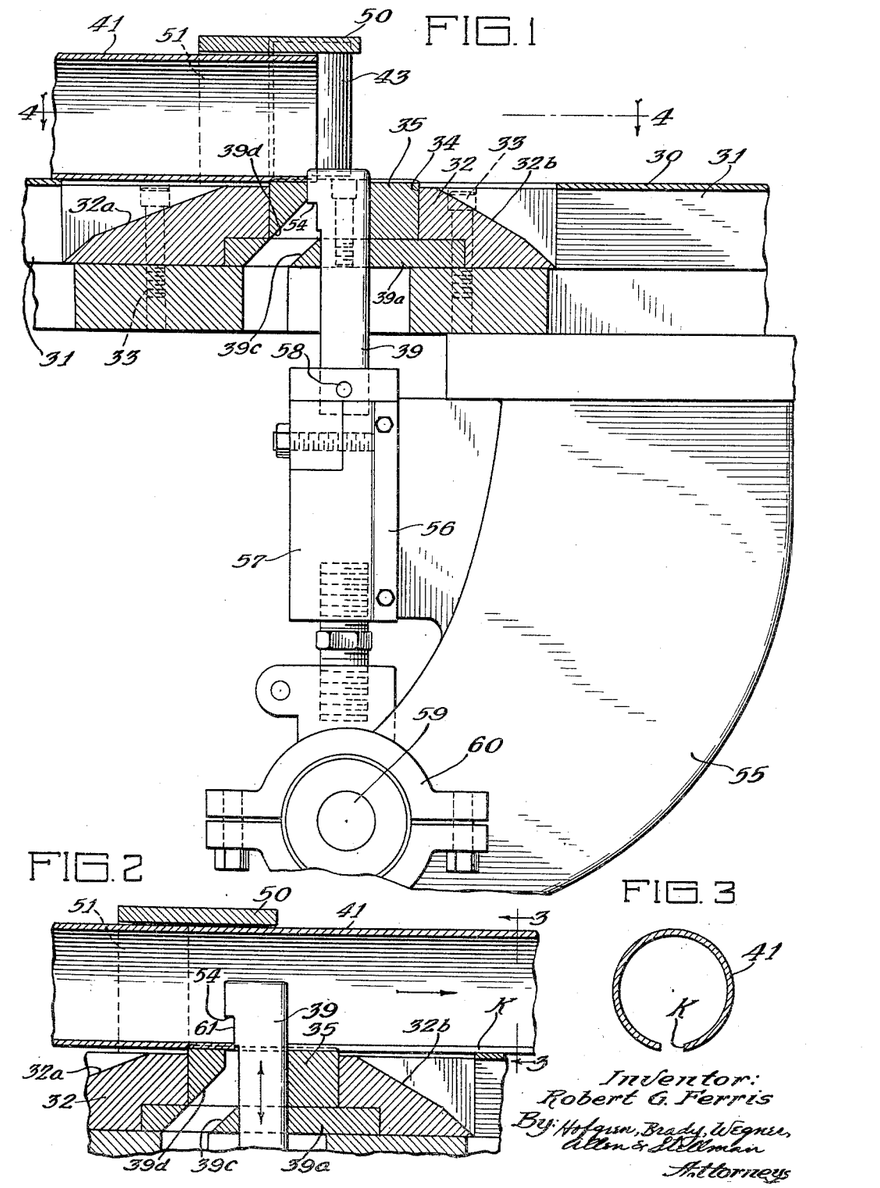
FIG. 1 is a vertical section taken generally along the line 1—1 in FIG. 4 showing the slot cutting mechanism for the tubular track with the hook-nose punch shown in its down position in which the plane of the slot is normal to the plane of track section curvature.
FIG. 2 is a fragmentary vertical section similar to FIG. 1 showing the hook-nose punch in its upper position and an intermediate stage in formation of the slot with the track section advanced toward the right as compared to FIG. 1.
FIG. 3 is a vertical section taken along the line 3—3 in FIG. 2 showing the cross section of the tubular track section.
Figure 4:
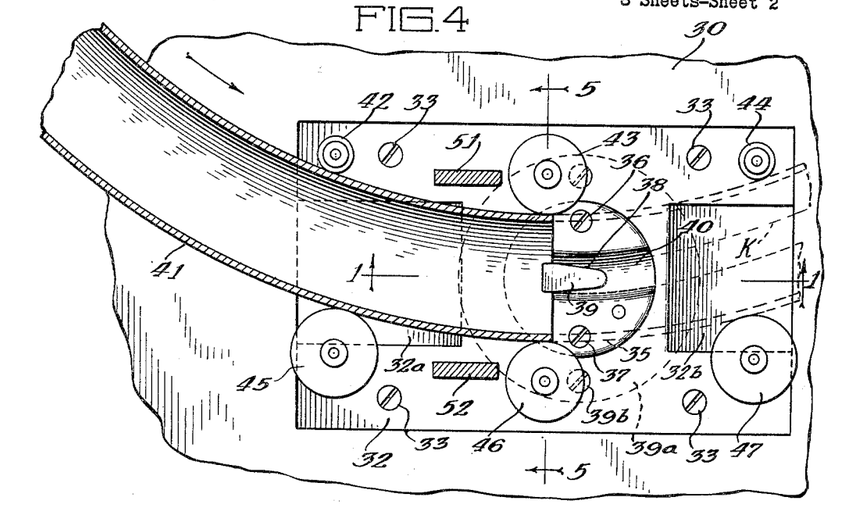
FIG. 4 is a plan section taken generally along the line 4—4 in FIG. 1.
Figure 5:
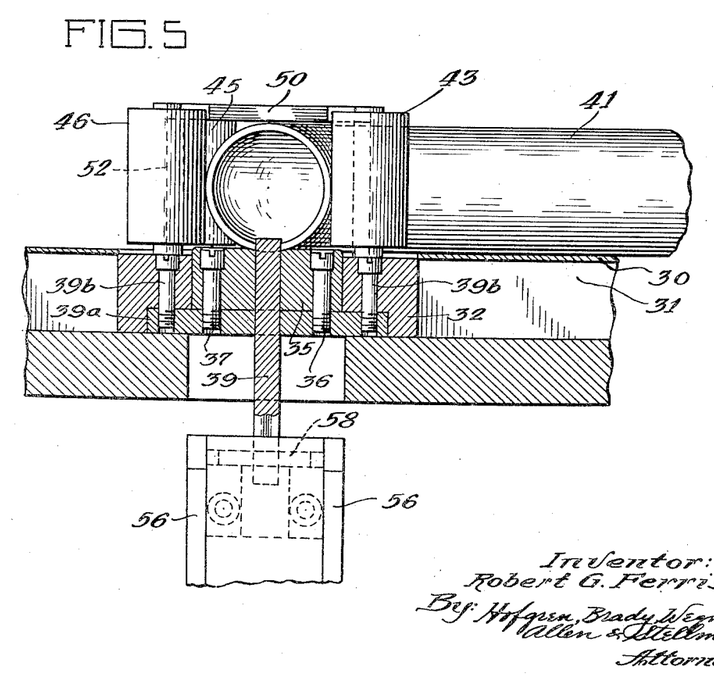
FIG. 5 is a vertical section taken generally along the line 5—5 in FIG. 4.

As shown in FIG. 4, a tubular member 41 is in initial position to commence cutting of a slot K on the underside thereof and an intermediate stage of the cutting has the tubular member positioned as shown in broken line in FIG. 4 and as positioned in FIG. 2. In order to guide the tubular member 41 in its passage past the hook-nose punch 39, guide means is provided on the die shoe 32 and comprises spaced apart means at each side of the path of travel of the member. As shown in FIG. 4, the guide means comprises a series of rollers 42, 43 and 44 at one side of the path and corresponding rollers 45, 46 and 47 at the opposite side of the path. The rollers engage the sides of the tubular member 41 and cause the underside of the tubular member 41 to rest upon the dished-out channel 40 in the die bushing 35 whereby the wall of the tubular member will be firmly supported immediately adjacent the location where the slot is cut progressively by the punch 39. In order to hold the tubular member 41 down upon the die bushing 35, a plate 50 overlies the tubular member and has opposed legs 51 and 52 supporting the plate in rigid spaced relation from the die shoe 32. The plate 50 is rigidly attached to the die shoe 32 by bolts (not shown) threaded in the die shoe.

The hook-nose punch, as shown in FIG. 12, has a shank 53, and the punch is formed with a shoulder 54 which acts as the cuting edge to remove material from the wall of the tubular member 41. The punch is shaped to be closely confined in the opening 38 in the die bushing 35.

The punch operating mechanism comprises a frame 55 secured to the table 31 beneath the top thereof which carries guideways 56 for a reciprocating ram 57 to which the punch is fastened by a pin 58. Means (not shown) are provided for reciprocating the ram 57 from a rotating drive shaft 59 carried in the frame 55 and journalled in bearings, one of which is shown at 60. As shown in the drawings, the punch 39 has an upper limit position, as shown particularly in FIG. 2, in which the shoulder 54 is located above the wall of the tubular member 41 and within the confines thereof. The punch 39 immediately beneath the shoulder 54 has a shank part 61 which acts to limit the travel of the tubular member 41 toward the right, as viewed in FIG. 2, as the member is manually advanced during the progressive formation of the slot in the member underside and also engages perforate plate 39a to prevent movement to the left. The lower limit position of the punch 39 is shown in FIG. 1, in which the shoulder 54 has moved below the upper surface of the die bushing 35, and the wall of the tubular member 41 has been notched by the nibbling action of the punch.

Also, as shown in FIG. 1, the die bushing is recessed to permit the removed material to fall from the bushing to a position beneath the table. With the mechanism herein described, the punch cuts on the downstroke thereof and will take repeated bites in the wall of the tubular member to produce the slot. The punch cuts from the inside of the tube out and therefore any ragged edges are external of the tube and can be readily removed with a file, and the inside is free from burrs. In one embodiment, with the punch taking repeated bites one-half inch wide and three-sixteenths inch deep in the direction of the tubular member length, and with the punch having 250 strokes per minute, a slot may be formed in a 90 degree curve of 37-38 inch radius in approximately one-half minute. The tubular member is manually advanced as rapidly as permitted by the punch in the path determined by the guide means on the die shoe 32.

The die bushing 35, as shown in FIGS. 8 and 9, has the dished-out channel 40 extending from both ends of the opening 38 for the punch 39 and is curved to conform to the curvature of the tubular member 41 which is bent on a relatively small radius. The punch 39 and opening 38 are both laid out symmetrical to the center line of the tubular member. The die bushing is provided with openings 65 and 66 to receive the machine bolts 36 and 37 for fastening thereof onto the die shoe 32.

In FIG. 12a, a die bushing 35b is shown in which the channel 40 has a lesser curve than the bushing of FIG. 8 to be used in the manner shown in the construction of FIG. 1 when nibbling a slot in a tubular member bent to a larger radius.

Figure 6:
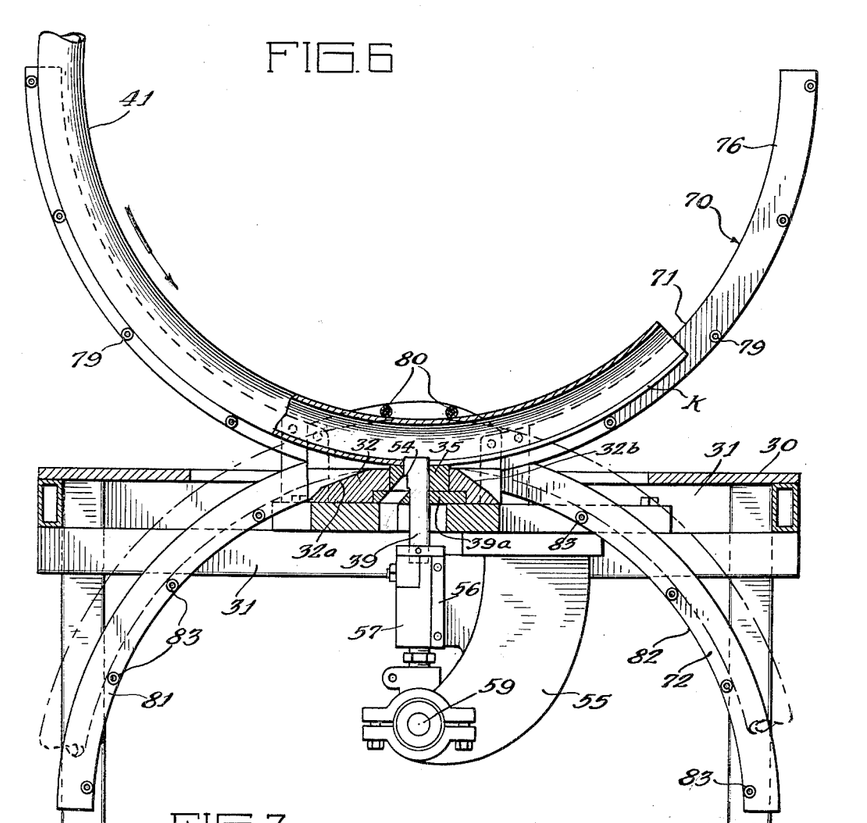
FIG. 6 is a front elevational view of the slot cutting apparatus with a fixture thereon for cutting a slot in the track section which is in the plane of the track section curvature and showing a tubular member disposed in the fixture with part thereof broken away, and with a tubular member in broken line also supported in the fixture in which the slot is cut at the inside of the track section curvature and with parts of the cutting mechanism shown in section.
Figure 7:
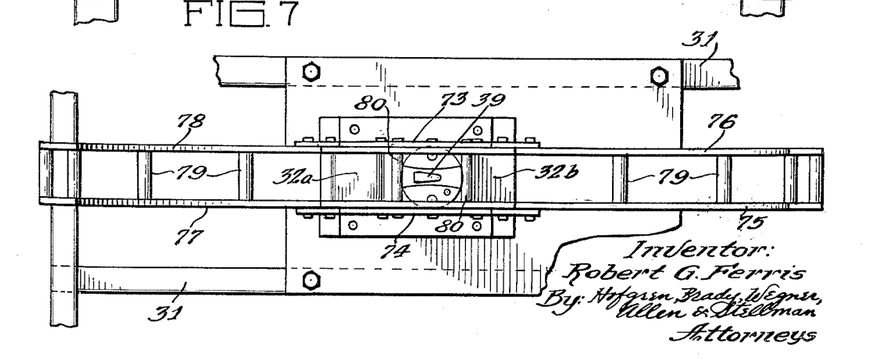
FIG. 7 is a plan view of the structure shown in FIG. 6 with the tubular member omitted.

In order to produce a slot K in a curved tubular member in which the plane of the slot is in the plane of the curve of the member, a different fixture 70 is associated with the punch and is shown in FIGS. 6 and 7. The fixture 70 embodies a first workholder 71 for supporting a curved tubular member in which the slot is to be formed at the outside of the curve and a second workholder 72 in which the slot is to be formed on the inside of the curve of a curved tubular member. The fixture 70 has a pair of central spaced apart mounting plates 73 and 74 to which a pair of curved spaced apart plates 75 and 76 are attached. A second pair of plates 77 and 78 extends from the opposite sides of said plates 73 and 74 and the plates 75—78 are spanned by a series of rollers 79. The assembly provides an upwardly concave workholder having the curvature of the tubular member 41 with the rollers 79 supporting the tubular member whereby it may easily be manually advanced past the punch 39. In order to hold the tubular member down at the location of the punch, a pair of bolts 80 may be positioned to span the distance between the plates 73 and 74 at a distance above the punch sufficient to permit movement of the tubular member 41 underneath.

The workholder 72 is generally the same as the workholder 71 except for being formed as downwardly concave and is formed from spaced apart plates in which one plate of each pair is shown at 81 and 82, and interconnecting rollers are indicated at 83. The workholder 72 has a curved tubular member associated therewith, as shown in broken line. The workholders 71 and 72 are usable one at a time. A die bushing 35a, shown in FIGS. 10 and 11, is used with the fixture 70 and is generally the same as that shown in FIG. 8 except that the dished-out channel 40 is slightly curved to have an upper convex surface when a slot is being cut on the inside of a curve in order to conform to the curvature of the tubular member. To further accommodate the structure to the curvature of the tubular member, the die shoe 32 is dished out at ends 32a and 32b as described previously to accommodate to the curvature of the tubular member.

In FIG. 6, a die bushing 35b is shown in which the upper surface is slightly concave as to closely support the tubular member 41 when cutting a slot in the outside of the curve of a tubular member.

In order to form a tubular track section having a curve therein, the tubular member is bent or formed to the proper radius and is then passed through the slot cutting mechanism with the mechanism arranged depending upon whether the slot is to be cut with the plane of the slot in the plane of the curve and either on the inside or outside of the curve, or whether the plane of the slot is at right angles to the plane of the curve. The tubular member is formed, in one embodiment, from welded seam mechanical tubing having a fairly high carbon content, such as C1030 steel. The tubing is then drawn to a lesser diameter to further work harden the tube and impart greater strength thereto. The tube is then bent to the proper radius.

Figures 15, 16, 17, 18:
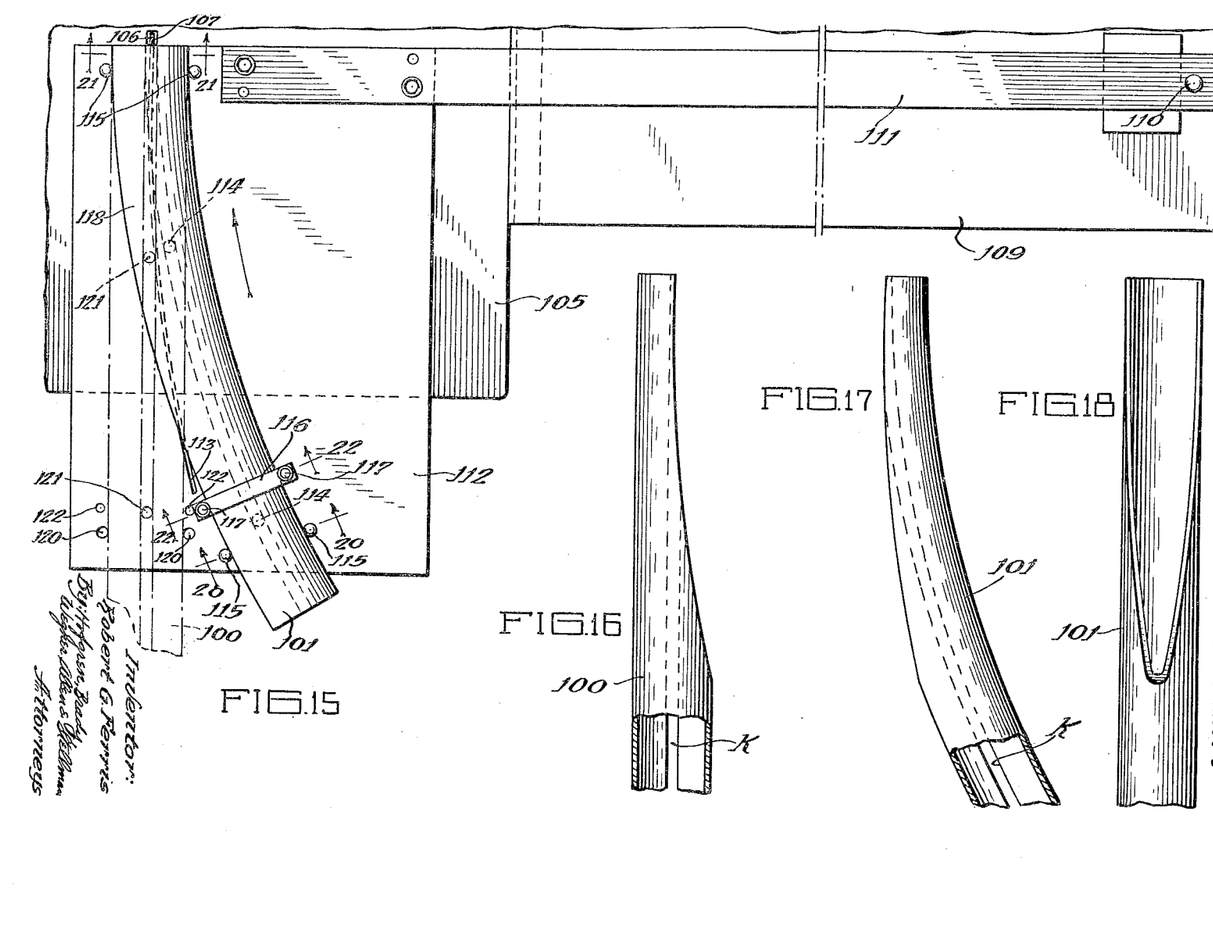
FIG. 15 is a fragmentary plan view of a cutting apparatus for cutting track sections prior to merger of a pair of track sections into an integral track curve.
FIG. 16 is a detail showing a straight track section after cutting of a segment therefrom.
FIG. 17 is a detail showing a curved track section with a segment cut from the side thereof.
FIG. 18 is a side elevational view of the track section shown in FIG. 17.
Figure 27:
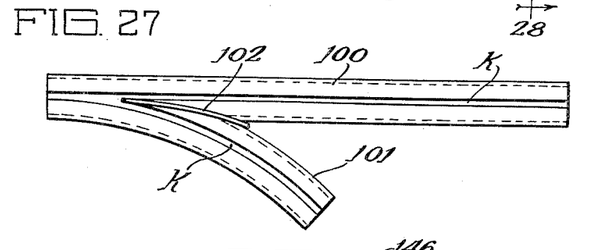
FIG. 27 is a plan view of a completed track curve.
Figure 28:
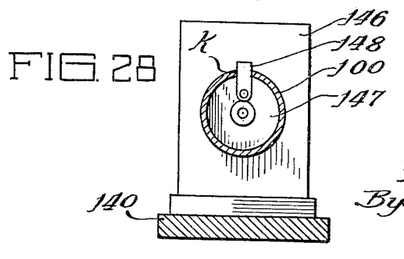
FIG. 28 is a vertical section taken along the line 28—28 in FIG. 25.

A track curve is shown in FIG. 27, and is disclosed in several different modes of use in my copending application referred to above. One use is shown in FIG. 13a in which trolleys 98 and 98a are shown one on each of diverging track sections 100 and 101, respectively. The trolley 98a has a guide 99 to cause it to follow the track section 101, as fully disclosed in my copending application. The track curve, in one embodiment, embodies a straight track section 100 which is merged with a curved track section 101 and interconnected by a reinforcing plate 102, shown in detail in FIG. 26. These individual track sections are shown in FIGS. 16, 17 and 18, and each has the slot K formed in the underside thereof. With the tubular members being of a circular cross section, in order to provide a clean continuous line of junction between the track sections a segment is cut from each along a curved cut line so as to result in a configuration of the track sections as shown in FIGS. 16, 17 and 18.

The apparatus for cutting the track sections 100 and 101 is shown in FIGS. 15 and 19 to 22, wherein a saw table 105 is provided with an opening 106 to receive a band saw blade 107 travelling vertically from a saw head 108 down through the table 105. A lateral table extension 109 carries a pivot pin 110 to which an arm 111 is pivoted at one end, and at its other end carries a support in the form of a plate 112 rigidly connected thereto for supporting either a straight track section 100 or a curved track section 101. The curved track section 101 is shown in full line in FIGS. 15 and 19, and a straight track section is shown in broken line in FIG. 15. The plate 112 has an elongated curved slot 113 formed as an arc of a circle with its center at the pivot pin 110 to permit passage of the band saw blade 106 through the plate 112 as the plate is swung about the pivot 110.

Means are provided on the plate 112 for locating and holding a curved track section 101 comprising a pair of pins 114 arranged to fit within the slot K on the underside of the track section and two pairs of spaced apart locating pins 115 positioned to engage the sides of the track section. A hold down bar 116 is spaced from the plate 112 to engage the top of the track section and is fastened to the plate by bolts 117 whereby the track section is held in located position on the plate 112. It will thus be seen that as the plate 112 is moved about its pivot 110, a segment 118 will be cut from the track section to provide the resulting shape shown in FIG. 17.

Means are provided on the plate for locating and holding the straight track section 100 including the locating pins 115 adjacent the end of the arm 111 which are fixed on the plate 112, and a pair of openings 120 for receiving the other pair of locating pins 115 which are removably fastened to the plate 112. There are also a pair of openings 121 for receiving the locating pins 114 which engage in the slot K of the straight track section 100. Also provided are a pair of openings 122 for receiving the bolts 117 of the hold down bar 116. It will be seen that with a straight track section 100 mounted on the plate 112, pivoting movement of the plate 112 about its pivot 110 will result in cutting a segment from a straight track section to provide the resulting track section shape shown in FIG. 16. To cut segments of the other hand, the slots of the track sections are on top and the pin 114 is then placed in the center of the hold down bar 116.

Figures 19, 20, 21, 22, 23:
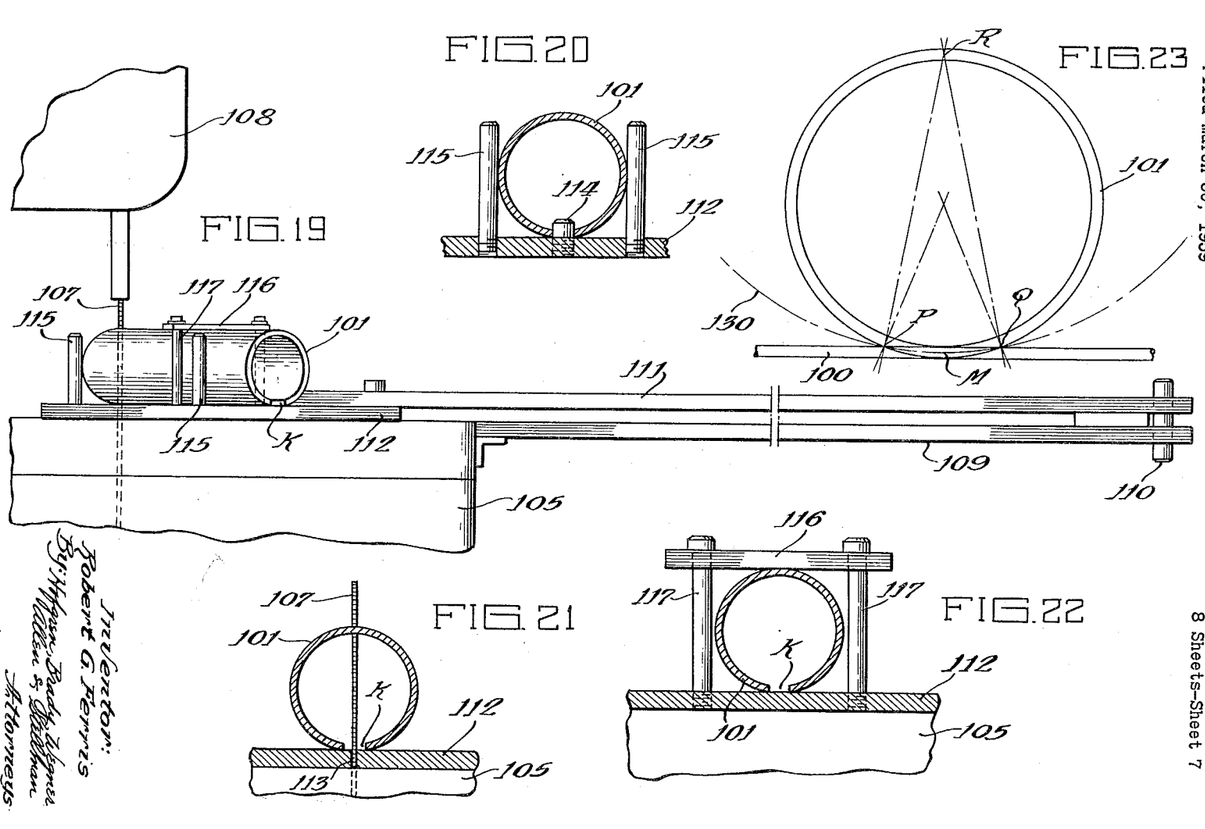
FIG. 19 is a fragmentary elevational view of the cutting apparatus shown in FIG. 15.
FIG. 20 is a fragmentary vertical section taken generally along the line 20—20 in FIG. 15.
FIG. 21 is a vertical section taken generally along the line 21—21 in FIG. 15.
FIG. 22 is a vertical section taken generally along the line 22—22 in FIG. 15.
FIG. 23 is an analytical diagram showing the method for selecting the saw cut radius.

As stated previously, the determination of the arcuate cutting line for cutting segments from the track sections is important to provide a continuous joint between the track sections, and this arcuate cutting line or saw cut radius may be determined in a manner as shown in FIG. 23. FIG. 23 is a diagrammatic cross section in the horizontal plane. Assuming that the straight track section 100 is indefinite in length and the curved track section 101 forms a complete annulus, and the track sections are of the same circular cross section, the center line of the straight track section 100 is tangent to the center line of the track section 101 at the point M and the two rack sections merge and are in alignment as the center lines lie in a common horizontal plane. PQ is a chord common to the intersecting arc of the outside circumference of the curved track section 101, and to the arc of the saw cut path 130, and is also common to the intersecting line of the straight track section 100 that is found in the common horizontal plane. With the chord PQ of the saw cut arc 130 and the arc of the intersecting part of the curved track section common to the intersecting side of the straight track section 100, a saw cut radius is determined as the distance PR, and determines the distance between the pivot pin 110 and the slot 113 in the supporting plate 112. In effect, the arcuate saw cut line passes through the slot K of each of the track sections 100 and 101 at the point where the two tubes merge and are in alignment if superimposed one above the other, and also passes through a point where the sections would diverge from each other, these points being M and P respectively in the diagrammatic showing of FIG. 23.

Figures 24, 25, 26:
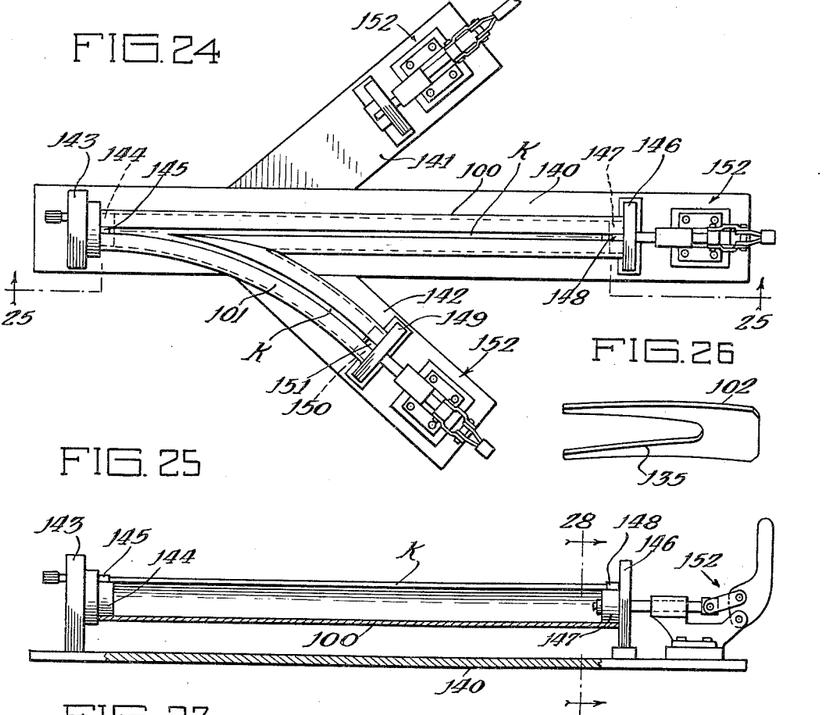
FIG. 24 is a plan view of a fixture for assembling track section into a track curve with a pair of sections shown in the fixture.
FIG. 25 is a vertical section taken generally along the line 25—25 in FIG. 24.
FIG. 26 is a detail view of the reinforcing plate used in assembling the track sections into a rigid track curve structure.

The reinforcing plate 102, as shown in FIG. 26, is curved along the length thereof to conform to the curvature of the junction between the track sections 100 and 101, as shown in FIG. 27, and the radius of this curve is the same as the saw cut radius of the track sections. The reinforcing plate 102 is cut out to form a notch 135 to follow the profile of the junction between the track sections and the shape is in the form of a catenary curve to form an ideal cantilever reinforcing member.

A device for securing the track sections 100 and 101 together into a track curve embodies a fixture having a main base section 140 with a pair of branches 141 and 142. The base 140 has an upstanding plate 143 at one end thereof carrying a plug 144 which enters into the end of the track sections 100 and 101 where they merge. With the track sections arranged with their slots K on the upper side, the plug 144 has a lug 145 to engage the slot at the end of the track sections to thus orient the sections. The other end of the base 140 carries a slidable plate 146 having a plug 147 with a lug 148 to fit within the end of the straight track section 100 and locate and orient the straight track section along with the plug 144. The branch 142 of the base also carries a slidable plate 149 with a plug 150 and having a lug 151 for orienting the other end of the curved track section 101. The plates 146 and 149 are each movable to a clamping position by handle operated cam mechanism, indicated generally at 152, mounted on the base of the fixture. Another assembly similar to that mounted on the base section 142 is mounted on the base section 141 for use with a track section 101 of a curve opposite that shown in FIG. 24. After the track sections are securely held in the fixture, the reinforcing plate 102 is assembled therewith and the parts secured by suitable means, such as welding.

The foregoing detailed description is given for clearness of understanding only, and no unnecessary limitations should be understood therefrom, as modifications will be obvious to those skilled in the art.

I claim:

1. The method of producing a curved conveyor track section with a slot extending along the entire length of the underside thereof from a tubular member comprising, drawing tubing to a lesser diameter to form the tubular member, bending the tubular member to a desired curvature, supporting the curved tubular member at an operating location, moving a punch disposed within the tubular member back and forth in a path generally normal to and across the member wall to nibble material from the wall on each stroke of the punch, advancing the tubular member lengthwise relative to the operating location to progressively nibble material from the wall, guiding the tubular member movement both in the plane of the curve in said tubular member and in a plane normal to said first mentioned plane including hold-down of the tubular member to have the nibbling operation form a slot extending along the underside of the tubular member, and holding down the tubular member during the nibbling operation.

2. The method of producing a curved conveyor track section with a slot therein from a tubular member comprising, bending the tubular member to a desired curvature, supporting the curved tubular member at an operating location, nibbling material from the wall of the member at the operating location from within the member while advancing the tubular member for the length thereof lengthwise relative to the operating location to progressively nibble material from the wall, and guiding the tubular member movement both in the plane of the curve in said tubular member and in a plane normal to said first mentioned plane to have a slot extending along the tubular member midway between the sides of the tubular member.

3. The method of cutting a slot along the entire length of the wall of an elongated tubular curved member of circular cross section to form a conveyor track section, comprising, supporting the tubular member at an operating location, reciprocating a nibbling tool within the member back and forth across the wall of the member at the operating location, advancing the tubular member progressively past the operating location to produce a slot in the wall of the tubular member, and guiding the tubular member during the advancing movement thereof to have the slot normal to a line extending between sides of the tubular member and equidistant from said sides.

4. An apparatus for cutting a slot along the entire underside of a track section formed from a curved length of tubular member comprising an operating station having a workpiece supporting surface, a nibbling tool at said station extending upwardly above the top of the supporting surface to a level beneath the upper surface of the tubular member to be positioned therein, means beneath the surface for reciprocating said tool between positions above and below said surface, and means for guiding the tubular member during movement thereof past the station to have the tool progressively nibble material from the member wall at the underside thereof to form a slot in the member.

5. A slot cutting apparatus for forming a slot along the entire length of a track section formed from an arcuate tubular member, comprising a support for the tubular member engaging the side thereof and having a central opening, a reciprocating hook-nose punch positioned in said opening to extend thereabove to a level beneath the top of the tubular member, means beneath the support for reciprocating and guiding said punch, and guide means defining a path of the same radius as the tubular member, said guide means being engageable with said tubular member to guide the side of the member over said central opening and including a hold-down plate whereby the punch may remove material from the member wall on movement of the punch toward the support to form a slot by relative advance of the member to the punch.

6. A slot cutting apparatus for forming a slot along the entire length of a track section formed from an arcuate tubular member, comprising a support for the tubular member engaging the underside thereof having a central opening, a reciprocating punch positioned in said opening to extend thereabove into the interior of the tubular member, means externally of the tubular member including said support for guiding and supporting the punch means beneath the support for reciprocating said punch, and guide means for guiding the member underside over said central opening whereby the punch may remove material from the member wall to form a slot by relative advance of the member to the punch.

7. An apparatus for cutting a continuous slot in the underside of a tubular track member, comprising a frame, a die bushing on said frame having a central channel dished out to receive a portion of the member periphery, means defining an opening in said channel, a hook-nose punch disposed in said opening and having an upper position above the channel less than the diameter of the track member with the hook-nose spaced from the channel to have the punch shank exposed, said die bushing guiding and supporting the punch, means beneath the die bushing for reciprocating the punch to remove material from the member wall on movement of the punch toward the die bushing with the punch shank acting as a limit to advance the member when the punch is in said upper position, and member guiding means defining a curved path of the same curvature as a member to guide the member along and against said channel and center the member over said opening whereby the punch produces a slot in the member wall along the center line of the member as the member is advanced along said path.

8. An apparatus as defined in claim 7 in which the guide means for a member having a slot produced therein lying in the plane of member curvature and at the inside of the curve includes a convex cradle structure fixed relative to the frame and shaped to receive the tubular member with a portion of the member periphery at the inside of the curve in said channel, and said die shoe has parts thereof adjacent the ends of the channel depressed to provide clearance for the member.

9. An apparatus as defined in claim 7 in which the guide means for a member having a slot produced lying in a plane normal to the plane of member curvature comprises a series of spaced apart guides along each side of the member path and both in front of and behind the channel opening in the direction of member advance.

10. An apparatus as defined in claim 7 in which the guide means for a member having a slot produced therein lying in the plane of member curvature and at the outside of the curve includes a concave cradle structure fixed relative to the frame and shaped to receive the tubular member with a portion of the member periphery at the outside of the curve in said channel.

References Cited in the file of this patent

UNITED STATES PATENTS

| | | |
|---|---|---|
| 1,945,078 | Riemenschneider | Jan. 30, 1934 |
| 2,094,928 | Ostberg | Oct. 5, 1937 |
| 2,105,618 | Silva | Jan. 18, 1938 |
| 2,248,969 | Darling | July 15, 1941 |
| 2,335,720 | Yeomans | Nov. 30, 1943 |
| 2,363,630 | Wales | Nov. 28, 1944 |
| 2,364,334 | Wold | Dec. 5, 1944 |
| 2,574,714 | Smith | Nov. 13, 1951 |
| 2,616,160 | Noll | Nov. 4, 1952 |
| 2,691,206 | Kautz | Oct. 12, 1954 |
| 2,838,832 | Potter | June 17, 1958 |